United States Patent
Cheta et al.

(10) Patent No.: US 9,798,318 B2
(45) Date of Patent: Oct. 24, 2017

(54) ONLINE FREQUENCY RESPONSE CHARACTERIZATION SYSTEM AND METHOD

(71) Applicant: General Electric Company, Schenectady, NY (US)

(72) Inventors: Ahmed My Cheta, Pearland, TX (US); Mark Eugene Shepard, Roanoke, VA (US); Seth Andrew Hendrickson, Gardnerville, NV (US); Benjamin David Laskowski, Greenville, SC (US); Patrick Nkrumah Adasa, Marietta, GA (US); Mohamed Ahmed Aljahmi, Dearborn, MI (US); Andrew David McArthur, Salem, VA (US)

(73) Assignee: General Electric Company, Schenectady, NY (US)

(*) Notice: Subject to any disclaimer, the term of this patent is extended or adjusted under 35 U.S.C. 154(b) by 447 days.

(21) Appl. No.: 14/252,444

(22) Filed: Apr. 14, 2014

(65) Prior Publication Data
US 2016/0048125 A1 Feb. 18, 2016

(51) Int. Cl.
*G05B 19/418* (2006.01)
*G06F 17/14* (2006.01)

(52) U.S. Cl.
CPC ....... *G05B 19/4184* (2013.01); *G06F 17/141* (2013.01); *G05B 2219/41417* (2013.01); *Y02P 90/14* (2015.11)

(58) Field of Classification Search
CPC ...... G05B 19/4184; G05B 2219/41417; G06F 17/141; Y02P 90/14
See application file for complete search history.

(56) References Cited

U.S. PATENT DOCUMENTS

| | | | |
|---|---|---|---|
| 4,059,960 A | * | 11/1977 | Osborne ........... F01D 21/20 116/277 |
| 7,693,212 B2 | * | 4/2010 | Petchenev ........ G01R 31/343 375/219 |

(Continued)

OTHER PUBLICATIONS

Toshitaka Tsuda, Proceedings of the Japan Academy, Ser. B, Physical and Biological Sciences, Jan. 10, 2014, 17 pages.*

(Continued)

*Primary Examiner* — Sean Shechtman
*Assistant Examiner* — Tri T Nguyen
(74) *Attorney, Agent, or Firm* — Fletcher Yoder, P.C.

(57) ABSTRACT

A system may include a controller that may control operations of a device according to a control loop and characterize a frequency response of the device while the device is operating. The controller may characterize the frequency response by adding a perturbation signal to any signal in the control loop. The controller may then determine a first transformed signal by performing a first discrete Fourier transform on a first signal in the control loop at a frequency of the perturbation signal and determine a second transformed signal by performing a second discrete Fourier transform on a second signal in the control loop at the frequency of the perturbation signal. The controller may then determine the frequency response at the frequency by comparing a first amplitude and a first phase of the first transformed signal to a second amplitude and a second phase of the second transformed signal.

21 Claims, 4 Drawing Sheets

(56) References Cited

U.S. PATENT DOCUMENTS

| | | | | |
|---|---|---|---|---|
| 8,326,513 B2* | 12/2012 | Singh | ............... | F23N 5/242 |
| | | | | 60/773 |
| 2004/0064202 A1* | 4/2004 | Kothare | ............... | G05B 17/02 |
| | | | | 700/39 |
| 2004/0162624 A1* | 8/2004 | Papiernik | ............... | G05B 11/42 |
| | | | | 700/38 |
| 2011/0050339 A1* | 3/2011 | Ohkawara | ............... | H03F 1/3294 |
| | | | | 330/149 |

OTHER PUBLICATIONS

Andrew E. Yagle, DFT:Discrete Fourier Transform, Dept. of EECS, The University of Michigan, Ann Arbor, MI, 2005, 14 pages.*

* cited by examiner

ONLINE FREQUENCY RESPONSE CHARACTERIZATION SYSTEM AND METHOD

BACKGROUND

The subject matter disclosed herein relates to industrial control systems. Specifically, the current application relates to characterizing a frequency response of a control system that operates an industrial system.

Certain systems, such industrial control systems, may provide for control capabilities that enable the execution of control instructions in various types of devices, such as turbines, motors, generators, and the like. Generally, these industrial control systems cannot determine various online system performance characteristics, such as a device's transfer function and stability margins while the device is online. Accordingly, it would be helpful to provide a system with the ability to characterize the performance of an industrial control system while the system is operating.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system may include a controller that may control operations of a device according to a control loop. The controller may also characterize a frequency response of the device while the device is operating. The controller may characterize the frequency response by adding a perturbation signal to any signal in the control loop. The controller may then determine a first transformed signal by performing a first discrete Fourier transform on a first signal in the control loop at a frequency that corresponds to the perturbation signal and determine a second transformed signal by performing a second discrete Fourier transform on a second signal in the control loop at the frequency that corresponds to the perturbation signal. The controller may then determine the frequency response at the frequency by comparing a first amplitude and a first phase of the transformed first signal to a second amplitude and a second phase of the transformed second signal.

In another embodiment, a tangible, non-transitory, machine-readable medium, may include machine-readable instructions to add a perturbation signal to an error signal representing a difference between a desired measurement output of a control system and a measurement output of the control system, thereby generating a perturbation-error signal. The machine-readable instructions may then perform a discrete Fourier transform on the perturbation-error signal and the measurement output at a frequency that corresponds to the perturbation signal, thereby determining a transformed perturbation-error signal and a transformed measurement output. The machine-readable instructions may then compare a first amplitude and a first phase of the transformed perturbation-error signal to a second amplitude and a second phase of the transformed measurement output, thereby determining a frequency response of the control system at the frequency.

In yet another embodiment, a method may include receiving a range of frequencies. The method may then include adding a first perturbation signal at a first frequency of the range to a node of a control loop in a control system. The method may then perform a discrete Fourier transform on at least two signals in the control loop at the first frequency, thereby determining at least two transformed signals. Afterwards, the method may include determining a complex ration between any two of the at least two transformed signals, thereby determining a first frequency response of the control system at the first frequency. The method may then repeat the steps described above using a second perturbation signal at a second frequency of the range, thereby determining a second frequency response of the control system at the second frequency

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally related to characterizing a performance of a feedback control system used when operating an industrial plant (e.g., a facility having various machinery, automation equipment, assembly lines, power generation equipment, chemical production systems, etc.) while the plant is online (i.e., operating). In one embodiment, a small amplitude perturbation signal p(t) may be added to an error signal e(t) of the feedback control system used to control the operation of a plant. The error signal e(t) with the perturbation signal p(t) (i.e., $e_p(t)$) and a measured output f(t) of the plant may then be analyzed using a Discrete Fourier Transform (DFT). As a result of the analysis, a magnitude and a phase response of the feedback control system may be determined at a frequency that corresponds to the frequency at which the perturbation signal p(t) was added to the error signal e(t). In this manner, the frequency response (i.e., magnitude and a phase response) of the feedback control system may be determined for a particular frequency. In certain embodiments, the frequency response of the feedback control system may be determined over a range of frequencies by repeating the above process over a range of frequencies of interest. That is, the above process may be repeated using a small amplitude perturbation signal at different frequency values that corresponds to frequencies in the range of frequencies of interest.

Figure 1:
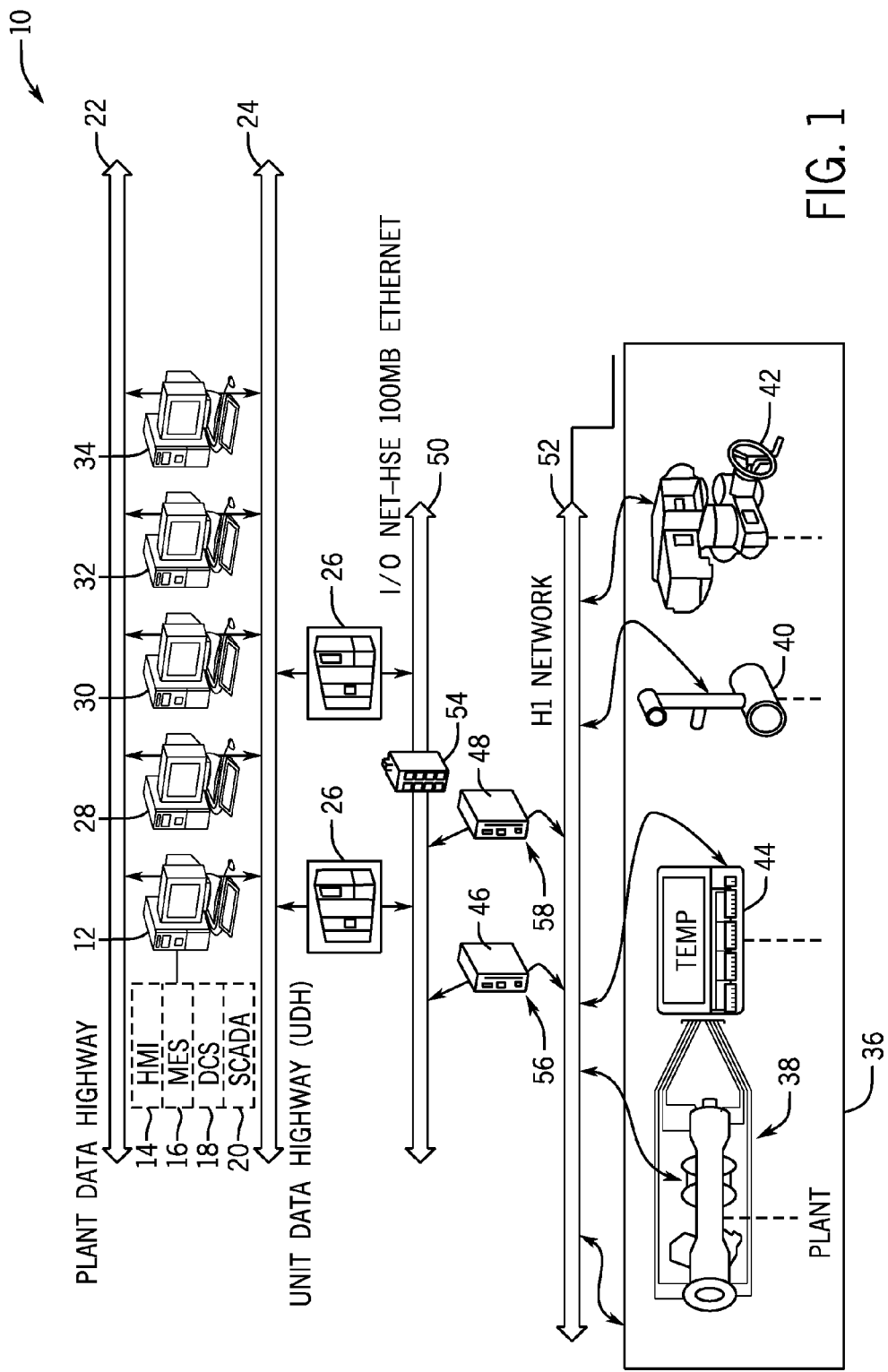
FIG. 1 is a schematic diagram of an embodiment of an industrial control system.

By way of introduction, FIG. 1 illustrates an embodiment of an industrial process control system 10. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and the like. Other computers coupled to the plant data highway 22 and/or the unit data highway 24 may include computers hosting Cimplicity™, ControlST™, and ToolboxST™, available from General Electric Co., of Schenectady, N.Y.

The system 10 may include any number and suitable configuration of industrial controllers 26. For example, in some embodiments the system 10 may include one industrial controller 26, two industrial controllers 26, three industrial controllers 26, or more industrial controllers 26 for redundancy. The industrial controllers 26 may enable control logic useful in automating a variety of equipment in a plant 36, which may include a turbine system 38, a valve 40, and a pump 42. For example, the plant 36 may be a power plant, a chemical production plant, a water treatment plant, a product assembly plant, or a combination thereof. By further example, the power plant 36 may include a gasification system to generate a syngas from a feedstock, a gas treatment system, a gas turbine system driven by syngas, a heat recover steam generator (HRSG) that generates steam using heat recovered from turbine exhaust gas, and a steam turbine driven by the steam, wherein the steam turbine and the gas turbine both drive one or more electrical generators.

In certain embodiments, the controller 26 may include a communication component, a processor, a memory, a storage, input/output (I/O) ports, and the like. The communication component may be a wireless or wired communication component that may facilitate communication between controller 12 and the turbine system 38, the valve 40, the pump 42, and the like. The processor may be any type of computer processor or microprocessor capable of executing computer-executable code. The memory and the storage may be any suitable articles of manufacture that can serve as media to store processor-executable code, data, or the like. These articles of manufacture may represent non-transitory computer-readable media (i.e., any suitable form of memory or storage) that may store the processor-executable code used by the processor to, among other things, characterize a performance of a feedback control system used when operating an industrial plant while the plant is online (i.e., operating). The non-transitory computer-readable media merely indicates that the media is tangible and not a signal.

Indeed, the industrial controllers 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth. In certain embodiments, the industrial controller 26 may employ feedback control systems as part of its control logic in operating various equipment in the plant 36.

In the depicted embodiment, the turbine system 38, the valve 40, the pump 42, and the temperature sensor 44 are communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52.

Figure 2:
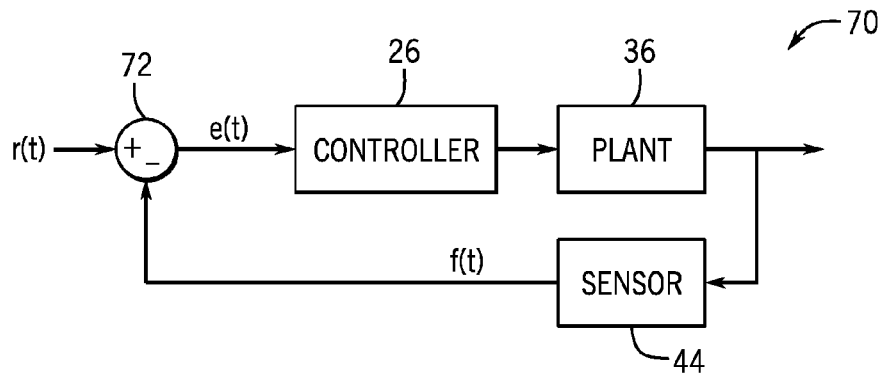
FIG. 2 is a functional block diagram illustrating a feedback control system for operating a plant of the industrial control system of FIG. 1, in accordance with an embodiment.

Keeping the foregoing in mind, FIG. 2 illustrates a feedback control system 70 that may be used to control one or more operations of the plant 36. Although FIG. 2 is depicted with the plant 36, it should be noted that the feedback control system 70 may be implemented with any device in the plant 36, such as the turbine 38, a compressor, a motor, a generator, a gasifier, a gas treatment system, a heat recovery steam generator, a combustion system, a reactor, an industrial machine, a fluid-based system or any other suitable device that may be operated using a control system. In certain embodiments, the feedback control system 70, and the components described as part of the feedback control system 70, may be implemented via circuitry or software executed on a non-transitory computer-readable medium.

Generally, the feedback control system 70 may receive a reference signal r(t) at an error signal generator 72. The error signal generator 72 may be implemented using a circuit or software logic that determines a difference between two signals. The error signal generator 72 may also receive a measurement output f(t) of the plant 36 via the sensor 44. Here, the error signal generator 72 may subtract the measurement output f(t) from the reference signal r(t) to determine an error signal e(t) that represents the difference between the measurement output f(t) and the reference signal r(t). The operation of the error signal generator 72 is detailed below in Equation 1.

$$e(t)=r(t)-f(t) \tag{1}$$

The reference signal r(t) may correspond to a desired output of the plant 36. As such, the difference between the measurement output f(t) and the reference signal r(t) (i.e., the error signal e(t)) may be used by the controller 26 to adjust operations of the plant 36, such that the measurement output f(t) substantially matches the reference signal r(t).

Figure 3:
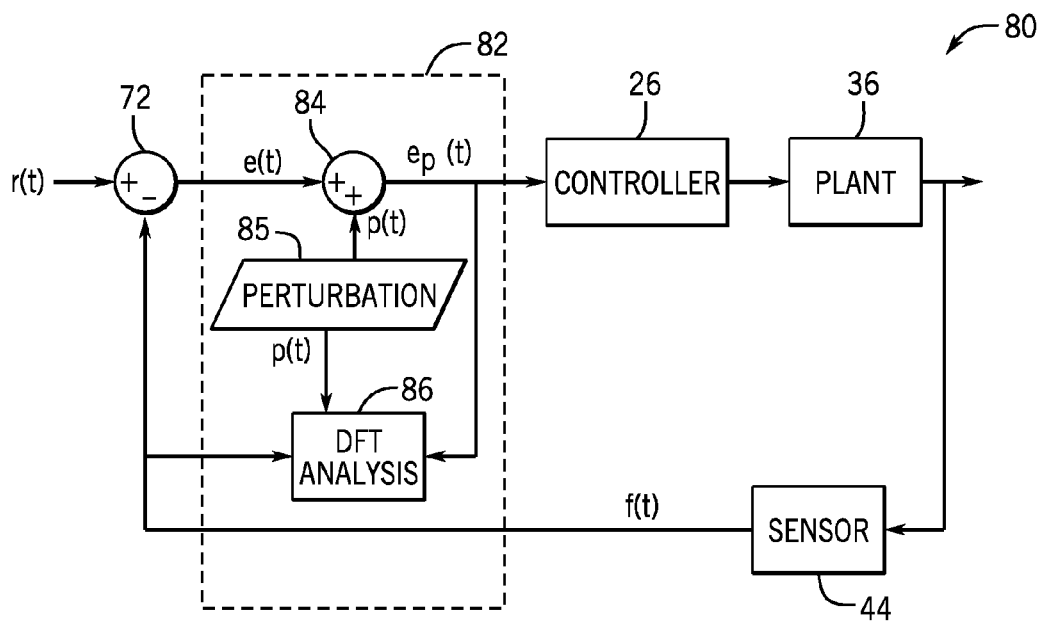
FIG. 3 is a functional block diagram illustrating a feedback control system used for characterizing a frequency response of a plant in the industrial control system of FIG. 1, in accordance with an embodiment.

Keeping this in mind, FIG. 3 illustrates a feedback control system 80 that may characterize a frequency response of the plant 36. As shown in FIG. 3, the feedback control system 80 is similar to the feedback control system 70 of FIG. 2 except that the feedback control system 80 includes a frequency response analysis component 82 between the error signal generator 72 and the controller 26. The frequency response analysis component 82 and the components described as part of the frequency response analysis component 82 may be implemented using circuitry or software logic. In one embodiment, the frequency response analysis component 82 may be implemented in a Mark* VIe controller available from General Electric Co., of Schenectady, N.Y.

In certain embodiments, the frequency response analysis component 82 may include an error signal generator 84 that may receive the error signal e(t) output by the error signal generator 72 and one or more perturbation signals 85 p(t). The perturbation signal 85 may include a small amplitude perturbation at a desired frequency in the form of a square wave, a triangle wave, a sawtooth wave, a sinc wave, or any suitable signal with frequency components at the desired frequency. In one example, to provide for a high signal to noise ratio, the perturbation signal 85 may be a monochromatic sinusoid wave. Although the perturbation signal 85 is described as being a periodic signal, it should be noted that the perturbation signal 85 may include an aperiodic step signal or an aperiodic impulse signal. That is, the perturbation signal 85 may be any type of signal—periodic or aperiodic.

Generally, the perturbation signal 85 p(t) may be a signal that is not large enough to significantly alter the designed behavior of the feedback control system 80. However, to ensure an accurate determination of the frequency response of the feedback control system 80, the perturbation signal 85 p(t) may be large enough to be distinguished from random noise in the feedback control system 80 and exceed any deadbands associated with the sensor 44 or the controller 26. In one embodiment, a minimum amplitude of the perturbation signal 85 p(t) may be large enough to cause several bits in a digitized measurement output f(t) signal (i.e., feedback signal) to change. Since the magnitude response of the feedback control system 80 is frequency-dependent, the minimum amplitude of the perturbation signal 85 p(t) is also frequency-dependent. As such, in one embodiment, the minimum amplitude of the perturbation signal 85 p(t) may be quantified through a coherence measurement, but the desired quality of the results depends on the application and the user.

Keeping the foregoing in mind, the determination of the value or amplitude to use for the perturbation signal 85 p(t) may be made one a case-by-case basis keeping the above factors in mind. In one embodiment, the perturbation signal 85 p(t) may be determined using a trial basis. For example, an ad-hoc method of slowly increasing the amplitude of the perturbation signal 85 p(t) and observing the response of the feedback control system 80 in time may be implemented to determine the amplitude value that may be used in the perturbation signal 85 p(t).

Upon receiving the perturbation signal 85 p(t) and the error signal e(t), the error signal generator 84 may add the perturbation signal 85 p(t) to the error signal e(t) to generate a perturbation-error signal $e_p(t)$ as shown below in Equation 2.

$$e_p(t)=e(t)+p(t) \tag{2}$$

The perturbation-error signal $e_p(t)$ may then be provided to the controller 26, which may neglect the perturbation signal 85 p(t) portion of the perturbation-error signal $e_p(t)$ to control the operation of the plant 36. That is, since the perturbation signal 85 p(t) may include just a small amplitude perturbation at the desired frequency, the perturbation signal 85 p(t) may not affect or inhibit the controller 26 from performing its control operations. As such, the controller 26 may generally continue to adjust the operations of the plant 36, such that the measurement output f(t) substantially matches the reference signal r(t).

In addition to being providing to the controller 26, the perturbation-error signal $e_p(t)$ may also be provided to a Discrete Fourier Transform (DFT) analysis component 86 along with the measurement output f(t). In certain embodiments, the DFT analysis component 86 may be implemented using circuitry or software logic. The DFT analysis component 86 may perform a Discrete Fourier Transform (DFT) on both the perturbation-error signal $e_p(t)$ and the measurement output f(t) to determine a frequency response of an open loop system such as the cascade of the feedback control system 80 which includes the controller 26, the plant 36, and the sensor 44 of FIG. 3. That is, the frequency response of the open loop system including the controller 26, the plant 36, and the sensor 44 may be extracted by examining the perturbation-error signal $e_p(t)$ entering the control system and comparing it to the signal output by the control system (i.e., the measurement output f(t)) using the DFT analysis component 86.

In certain embodiments, more than one perturbation signals 85 p(t) may be provided to the controller 26 at multiple frequencies. These perturbation signals 85 p(t) may be provided to the controller simultaneously to allow the DFT analysis component 86 to efficiently determine the frequency response of the open loop system at various frequencies. As such, the DFT analysis component 86 may perform multiple DFTs simultaneously.

In general, taking the DFT of a signal involves multiplying the signal by a complex exponential and then summing over a finite number of cycles as shown below in Equation 3.

$$\sum_{k=0}^{N-1} f(k) e^{-i2\pi \left(\frac{k}{N}\right) n} \tag{3}$$

where k represents a discrete time space, n represents a discrete frequency space (e.g., the desired frequency), and N represents a total number of cycles. In one embodiment, when performing the DFT analysis, the DFT analysis component 86 may automatically round the period of the perturbation-error signal $e_p(t)$ to an integer multiple of a sampling period to avoid spectral leakage of the measurement output f(t). The sampling period may correspond to a regular and constant interval at which the reference signal r(t) may be sampled.

By performing this DFT operation at the single discrete frequency n (e.g., the desired frequency) at which the perturbation signal 85 p(t) was applied, the DFT analysis component 86 may extract a single frequency component of interest for the perturbation-error signal $e_p(t)$ and the measurement output f(t). That is, the DFT analysis component 86 may determine the discrete Fourier transformed signals for the perturbation-error signal $e_p(t)$ and the measurement output f(t), which may be represented as $E_p(n)$ and F(n), respectively. The single discrete frequency n may be selected based on one or more goals of the end user. For example, if the user is interested in characterizing how the plant 36 behaves between 0 and 10 Hz, then the user may specify a set of single discrete frequencies at which to test. For example, the DFT operation may be performed at 0 Hz, 1 Hz, 2 Hz, 3 Hz, 4 Hz, 5 Hz, 6 Hz, 7 Hz, 8 Hz, 9 Hz, and 10 Hz. The resulting frequency responses at these frequencies may be used to determine whether the frequency response of the plant 36 is linear.

In addition to determining whether the frequency response of the plant 36 is linear, the resulting frequency responses may also provide information related to a magnitude of delay and attenuation that the plant 36 may impose on an input signal at the respective frequencies. As such, by employing this method of frequency analysis, a user may achieve better control system design, provide for more stable control systems, and the like. Moreover, the resulting frequency response may be a fully effective characterization of a linearized system while it is operating. That is, since the perturbation signal 85 p(t) is small enough to prevent significantly changing the operating point of the plant 36, the systems described herein may provide a significant benefit with respect to determining the frequency response of a system using a step response approach, which may significantly move the operating point of the plant 36.

The DFT analysis component 86 may then determine a frequency response of the open loop system at the single discrete frequency n by comparing an amplitude and phase of the transformed perturbation-error signal $E_p(n)$ to an amplitude and phase of the transformed measurement output signal F(n). The amplitude and phase of the open loop system response may be calculated for a single frequency n as shown below in Equations 4 and 5.

$$A = \frac{|F(k)|}{|E_p(k)|} \tag{4}$$

$$\phi = \angle F(k) - \angle E_p(k) \tag{5}$$

The resulting amplitude and phase values calculated using Equations 4 and 5 corresponds to the frequency response of the open loop system at a single frequency (e.g., the desired frequency). In one embodiment, the DFT analysis component 86 may then average the amplitude and phase response of the open loop system over a number of cycles, which may specified by a variable input. That is, the DFT analysis component 86 may average the transformed perturbation-error signal $E_p(n)$ and the transformed measurement output signal F(n) over a number of signal periods before calculating the frequency response of the open loop system. As a result, the DFT analysis component 86 may more accurately calculate the frequency response of the open loop system as compared to calculating the frequency response of the open loop system using a single transformed perturbation-error signal $E_p(n)$ and a single transformed measurement output signal F(n).

To reduce the effects of truncating the transformed perturbation-error signal $E_p(n)$ and the transformed measurement output signal F(n), the DFT analysis component 86 may apply a window function to the perturbation-error signal $e_p(t)$ and the measurement output f(t) prior to performing the discrete Fourier transform on the perturbation-error signal $e_p(t)$ and the measurement output f(t). For example, the applied window function may include, but is not limited to, a Blackman-Harris function, a Hamming function, a Gaussian function, a Bartlett-Hann function, etc.

Figure 4:
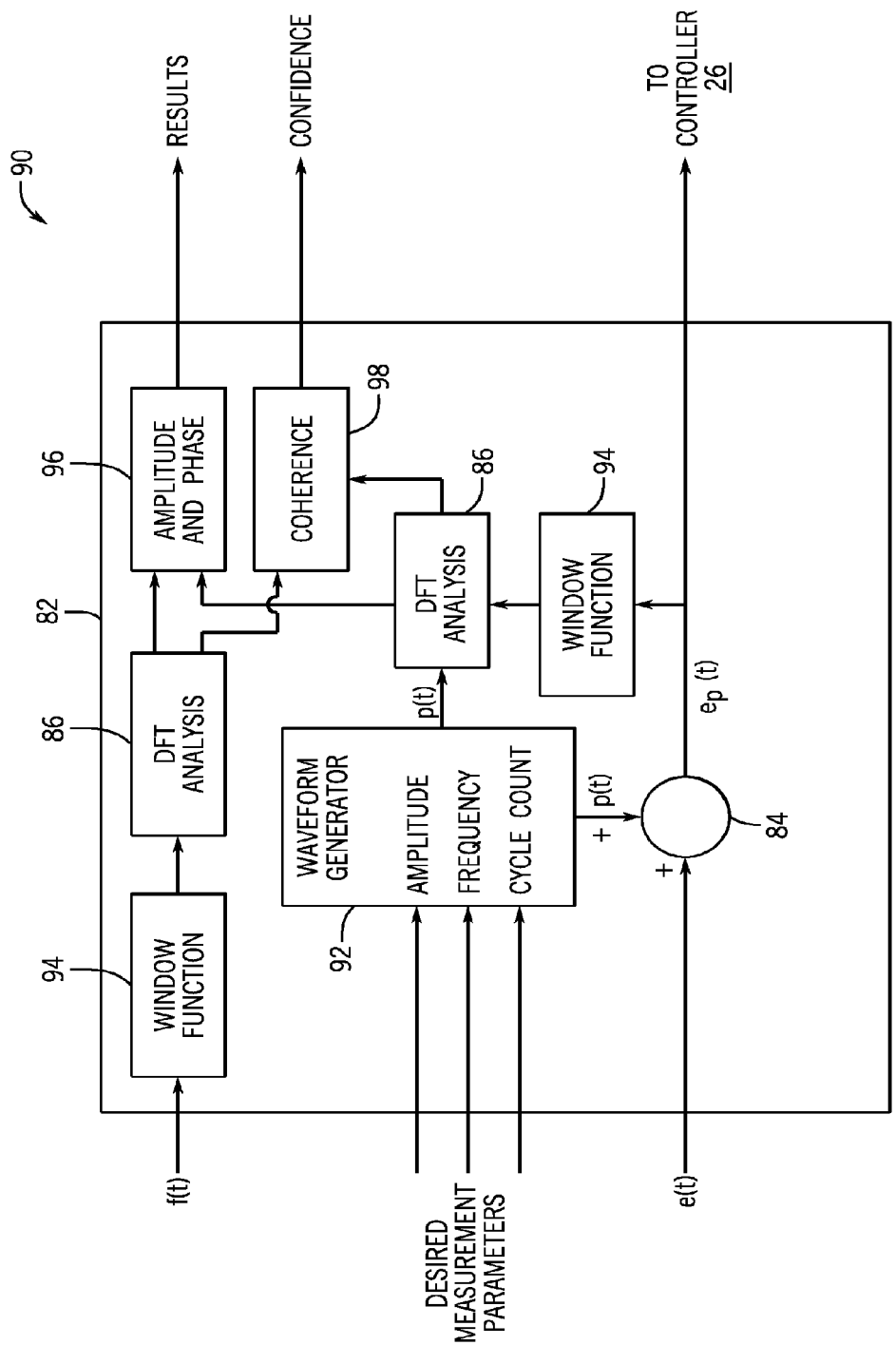
FIG. 4 is a functional block diagram illustrating a frequency response analysis component of the feedback control system of FIG. 3, in accordance with an embodiment.

Keeping the foregoing in mind, FIG. 4 illustrates a functional block diagram 90 that depicts an embodiment of how the frequency response analysis component 82 may be implemented. As shown in FIG. 4, the error signal e(t) may be received by the error signal generator 84 along with the perturbation signal 85 p(t), as described above. In one embodiment, the perturbation signal 85 p(t) may be generated by a waveform generator 92. The waveform generator 92 may generate the perturbation signal 85 p(t) based on desired measurement parameters that may be provided by a user. The desired measurement parameters may include a desired amplitude, a desired frequency, and a desired cycle count (i.e., number of averages).

After providing the perturbation signal 85 p(t) to the error signal generator 84, the error signal generator 84 may add the perturbation signal 85 p(t) to the error signal e(t) as described above with reference to FIG. 3. The error signal generator 84 may then output the resulting perturbation-error signal $e_p(t)$ to the controller 26 and to a window function component 94. In certain embodiments, the window function component 94 may be implemented using circuitry or software logic. The window function component 94 may filter the perturbation-error signal $e_p(t)$ using a window function, such as a Blackman-Harris function, a Hamming function, a Gaussian function, a Bartlett-Hann function, as mentioned above. The window function may decrease "smearing" of the frequency spectrum of the perturbation-error signal $e_p(t)$ due to sampling finite-length series that may not be periodic in the sampling period.

The filtered perturbation-error signal $e_p(t)$ may then be provided to the DFT analysis component 86 to determine a discrete Fourier transform of the filtered perturbation-error signal $e_p(t)$ at the desired frequency. The DFT analysis component 86 may then determine an amplitude and phase of the transformed perturbation-error signal $E_p(n)$ and provide the amplitude and phase of the transformed perturbation-error signal $E_p(n)$ to an amplitude and phase component 96. The amplitude and phase component 96 may then compare the amplitude and phase of the transformed perturbation-error signal $E_p(n)$ to an amplitude and phase of the transformed measurement output signal F(n).

The transformed measurement output signal F(n) may be obtained by receiving the measurement output f(t) at the window function 94, as shown in FIG. 4. The window function 94 may filter the measurement output f(t) to minimize side-lobe levels of the measurement output f(t) or the like. The filtered measurement output f(t) may then be provided to the DFT analysis component 86 to determine a discrete Fourier transform of the measurement output f(t) at the desired frequency, as specified at the waveform generator 92. The DFT analysis component 86 may then determine an amplitude and phase of the transformed measurement output F(n) and provide the amplitude and phase of the transformed measurement output F(n) to the amplitude and phase component 96. The amplitude and phase component 96 may then compare the amplitude and phase of the transformed perturbation-error signal $E_p(n)$ to the amplitude and phase of the transformed measurement output signal F(n) to determine the frequency response of the open loop system at the desired frequency, as described above.

In addition to sending the amplitude and phase of the transformed measurement output F(n) and the amplitude and phase of the transformed perturbation-error signal $E_p(n)$ to the amplitude and phase component 96, the DFT analysis components 86 may send these results to a coherence component 98. In certain embodiments, the coherence component 98 may be implemented using circuitry or software logic. The coherence component 98 may determine a coherence measurement or how much of the measurement output f(t) can be attributed to the perturbation signal 85 p(t).

In one embodiment, the coherence measurement may be computed as shown below in Equation 6:

$$C = \frac{|P_{xy}|^2}{P_{xx} P_{yy}} \quad (6)$$

where C is the coherence measurement that is reported to the user, $P_{xy}$ is a cross power spectrum, $P_{xx}$ is a power spectrum of the perturbation-error signal $e_p(t)$, and $P_{yy}$ is the power spectrum of the measurement output. In one embodiment, the cross power spectrum $P_{xx}$ and the power spectrum of the measurement output $P_{yy}$ may be equivalent to a magnitude squared of the Fourier transform of the perturbation-error signal $e_p(t)$ and the measurement output signal (respectively) evaluated at the frequency of interest. The cross power spectrum $P_{xy}$ may be equivalent to a complex conjugate of the Fourier transform of the perturbation-error signal $e_p(t)$ multiplied by the Fourier transform of the measurement output, both of which may be evaluated at the frequency of interest.

Generally, unless each of these power spectra is representative of a number of measurements averaged together, the resulting value of the coherence measurement C may be unity at all frequencies. As such, the sample embodiment of the frequency response analysis component 82 may divide a commanded measurement duration (e.g., cycle count parameter supplied to waveform generator 92) into ten intervals, such that each interval may have a length equal to $$\text{floor}\left(\frac{\text{cycle count}}{10}\right).$$

The power spectra may then be computed in each subinterval, averaged as complex numbers, and acted upon according to Equation 6. The result of the coherence computation may range between 0 and 1, inclusive, such that 1 signifies that all the power at the measurement frequency can be attributed to the perturbation signal p(t) 85, and 0 signifies that none of the power at the measurement frequency can be attributed to the perturbation signal p(t) 85. By considering this reported value in conjunction with the reported amplitude and phase results, the user may gain an understanding of the quality of the response measurement at that frequency.

In certain embodiments, the frequency response analysis component 82 may be connected to other parts of the feedback control system for determining the frequency response functions of smaller or different loops in an overall control system. In this same manner, the perturbation signal p(t) may be added to other signals besides the error signal e(t). That is, the DFT analysis component 86 may determine the frequency response of a system by analyzing any two points in a control loop.

Although FIGS. 3 and 4 depict the perturbation signal 85 p(t) being injected into the feedback control system 80 at the error signal generator 84, it should be noted that the perturbation signal 85 p(t) is not limited to being injected at the error signal generator 84. Instead, the perturbation signal 85 p(t) may be added at any node in the feedback control system 80. That is, the frequency response of the plant 36 may determined according the systems and methods described herein when the perturbation signal 85 p(t) is added within a control loop. For example, referring briefly to FIG. 3, the perturbation signal 85 p(t) may be added after the controller 26, the sensor 44, and the like.

Moreover, the embodiments described herein may also be used to determine the frequency response characteristics of an open control loop. That is, the frequency response between two points of an open control loop may be determined by determining a Discrete Fourier Transform (DFT) on two signals that correspond to the two points using the perturbation signal 85 p(t) as a reference. As such, the DFT measurement may be made at two points of the control loop relative to the perturbation signal 85 p(t). After determining the DFT measurements at the two points of the control loop, a ratio of the two DFT measurements may provide the frequency response between the two points of the control loop. As a result, the frequency response of an open loop inside a closed loop system may be obtained without opening the control loop.

Figure 5:
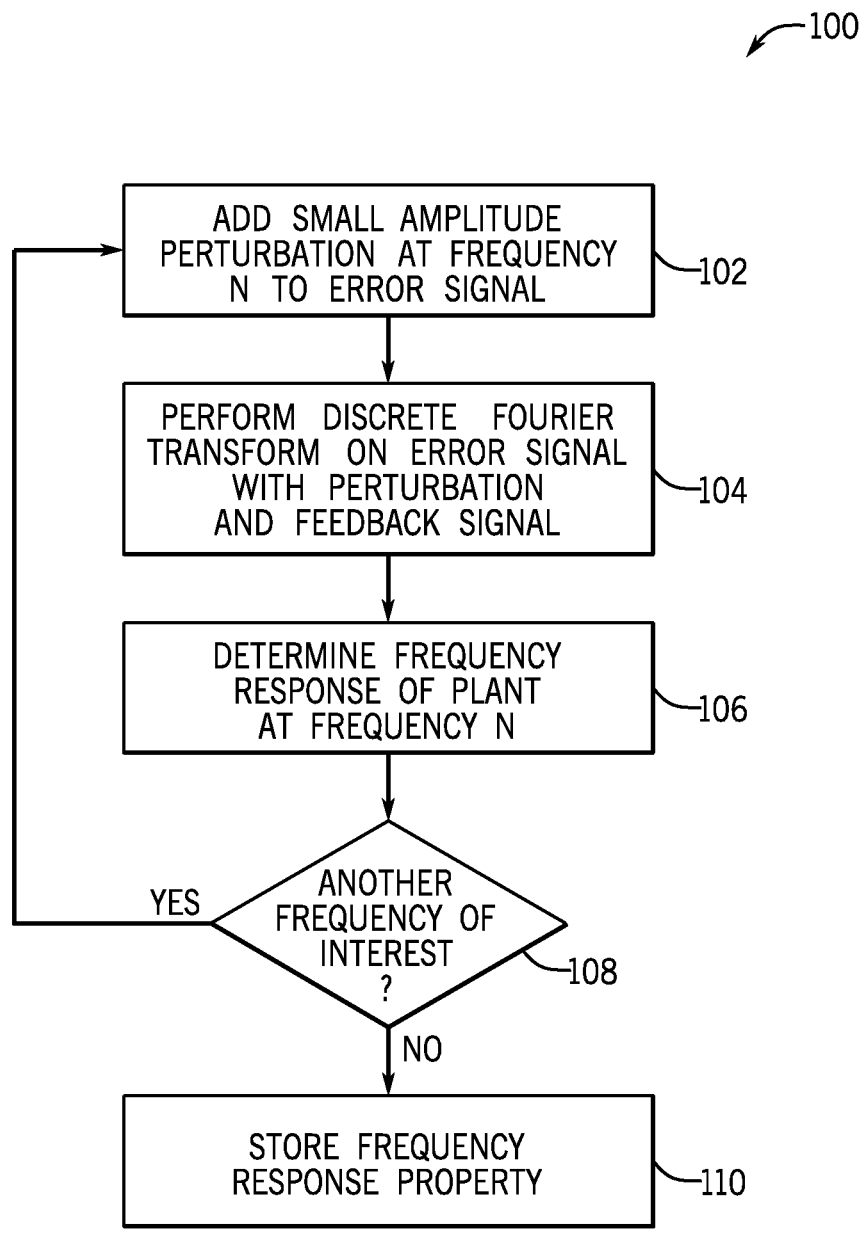
FIG. 5 is a flowchart illustrating a method for characterizing a frequency response of a feedback control system of a plant in the industrial control system of FIG. 1 at a number of frequencies, in accordance with an embodiment.

As mentioned above, the calculated frequency response of the open loop system corresponds to a single frequency (e.g., the desired frequency). To find the frequency response of the open loop system over a range of frequency, the process described above for calculating the frequency response of the open loop system at a single frequency may be repeated over a range of frequencies of interest. Keeping this in mind, FIG. 5 illustrates a flowchart of a method 100 for characterizing a frequency response of feedback control system over a range of frequencies of interest. In one embodiment, the controller 26 may implement the method 100, however, it should be noted that the method 100 may also be implemented by the computer 12 or any other suitable device having a processor, memory, etc. and may be capable of executing computer-readable instructions.

Referring to FIG. 5, at block 102, the controller 26 may add the small amplitude perturbation signal 85 p(t) at a first frequency to an error signal e(t) of a control system. The controller 26 may then, at block 104, perform a discrete Fourier transform on the perturbation-error signal $e_p(t)$ and a measurement output f(t) of the control system.

At block 106, the controller 26 may determine a frequency response of the control system at the first frequency using Equations 4 and 5. That is, the frequency response of the control system at the first frequency may be extracted by examining the perturbation-error signal $e_p(t)$ entering the control system and comparing it to the signal output by the control system (i.e., the measurement output f(t)) with respect to the first frequency using Equations 4 and 5, as provided above.

At block 108, the controller 26 may determine whether another frequency value of interest exists. In one embodiment, the controller 26 may receive an input that includes a range of frequency values of interest. As such, if the controller 26 determines that another frequency of interest exists, the controller 26 may return to block 102 and add the small amplitude perturbation signal 85 p(t) at a second frequency to an error signal e(t) of the control system. After completing the method 100 for the second frequency, the controller 26 may repeat the method 100 for each other frequency of interest. After determining the frequency response of the control system at each frequency of interest, the controller 26 may proceed to block 110 and store the frequency response properties for each frequency of interest in a memory or the like.

As mentioned above with respect to FIGS. 3 and 4, although FIG. 5 describes the method 100 for characterizing a frequency response as adding the perturbation signal 85 p(t) to an error signal e(t) at block 102, it should be noted that the perturbation signal 85 p(t) may be added at any point in the control system. That is, the frequency response of the corresponding control system may determined according the method 100 by comparing signals from two or more points in the control system with respect to the added perturbation signal 85 p(t).

Technical effects of the invention include providing a frequency domain tool (e.g., the frequency response analysis component 82) that may characterize a control loop under operating conditions. The frequency domain tool may thus allow constant online monitoring of phase and gain (e.g., magnitude) margins for a control system while the control system is operating. As such, the frequency domain tool may ensure that a control system employing a control loop is operating as expected while operating points shift due to changes at input/output ports, ambient environment conditions, continuous operation of a device, thermal cycles, and the like.

The frequency domain tool may characterize the performance of the control system during the operation of the control system by using information provided via a control loop in the control system. As such, the frequency domain tool may determine the frequency response of the control system, determine an entire plant's transfer function, and determine the stability margins for the plant based on the transfer function. The frequency domain tool may then make the controls for operating the control system more tolerant to variation, thereby allowing for more reliable control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a controller configured to:
control one or more operations of a device according to a control loop; and
characterize a frequency response of the device while the device is operating by:
adding a perturbation signal to a signal representing a difference between a desired measurement output of the control loop and a measurement output of the control loop;
determining a first transformed signal by performing a first discrete Fourier transform on a first signal in the control loop at a frequency that corresponds to the perturbation signal;
determining a second transformed signal by performing a second discrete Fourier transform on a second signal in the control loop at the frequency that corresponds to the perturbation signal, wherein the second signal comprises the measurement output of the control loop; and
determining the frequency response at the frequency by comparing a first amplitude and a first phase of the first transformed signal to a second amplitude and a second phase of the second transformed signal.

2. The system of claim 1, wherein the device comprises an industrial plant, a turbine, a compressor, a motor, a generator, a gasifier, a gas treatment system, a heat recovery steam generator, a combustion system, a reactor, an industrial machine, a fluid-based system, or any combination thereof.

3. The system of claim 1, wherein the perturbation signal comprises a square wave, a triangle wave, a sawtooth wave, or a sinc wave.

4. The system of claim 1, wherein the perturbation signal comprises a monochromatic sinusoid wave.

5. The system of claim 1, wherein the perturbation signal comprises a third amplitude configured not to affect the one or more operations in the control loop.

6. The system of claim 1, wherein the controller is configured to perform the first discrete Fourier transform on the first signal by setting a period of the first signal to an integer multiple of a sampling period of the first signal.

7. The system of claim 1, wherein the controller is configured to perform the first discrete Fourier transform on the first signal and the second discrete Fourier transform on the second signal by extracting a frequency component of interest for the first signal and the second signal.

8. The system of claim 1, wherein the controller is configured to determine the first transformed signal and the second transformed signal by:
averaging the first transformed signal over a number of signal periods; and
averaging the second transformed signal over the number of signal periods.

9. The system of claim 8, wherein the controller is configured to determine the frequency response at the frequency comprises comparing a third amplitude and a third phase of the averaged first transformed signal to a fourth amplitude and a fourth phase of the averaged second transformed signal.

10. The system of claim 1, wherein the controller is configured to apply a window function to the first signal and the second before determining the first transformed signal and the second transformed signal.

11. The system of claim 10, wherein the window function comprises a Blackman-Harris function, a Hamming function, a Gaussian function, or a Bartlett-Hann function.

12. The system of claim 1, wherein the controller is configured to determine the frequency response at the frequency by computing a complex ratio between the first transformed signal and the second transformed signal.

13. The system of claim 1, wherein the control loop is an open loop.

14. A tangible, non-transitory, machine-readable medium, comprising machine-readable instructions to, when executed, cause a processor to:
  add a perturbation signal to an error signal representing a difference between a desired measurement output of a control system and a measurement output of the control system, thereby generating a perturbation-error signal;
  perform a discrete Fourier transform on the perturbation-error signal and the measurement output at a frequency that corresponds to the perturbation signal, thereby determining a transformed perturbation-error signal and a transformed measurement output;
  compare a first amplitude and a first phase of the transformed perturbation-error signal to a second amplitude and a second phase of the transformed measurement output, thereby determining a frequency response of the control system at the frequency; and
  control, by the control system, a device while the frequency response is determined.

15. The machine-readable medium of claim 14, wherein the machine-readable instructions to compare the first amplitude and the first phase of the transformed perturbation-error signal to the second amplitude and the second phase of the transformed measurement output comprises determining a ratio between a first absolute value of the transformed measurement output to a second absolute value of the transformed perturbation-error signal.

16. The machine-readable medium of claim 14, wherein the perturbation signal comprises a square wave, a triangle wave, a sawtooth wave, a sinc wave, or a monochromatic sinusoid wave.

17. The machine-readable medium of claim 14, comprising machine-readable instructions to provide the perturbation-error signal to a controller configured to operate the device in the control system.

18. The machine-readable medium of claim 17, wherein the perturbation signal in the perturbation-error signal is negligible by the controller.

19. A method, comprising:
  receiving, via a processor, a range of frequencies;
  adding, via the processor, one or more perturbation signals at one or more frequencies of the range to a node of a control loop in a control system, wherein the node comprises an error signal representing a difference between a desired measurement output of the control system and a measurement output of the control system;
  performing, via the processor, one or more discrete Fourier transforms on at least two signals in the control loop at each of the one or more frequencies, thereby determining at least two transformed signals at each of the one or more frequencies, wherein one of the at least two signals comprise the measurement output of the control system;
  determining, via the processor, a complex ratio between any two of the at least two transformed signals at each of the one or more frequencies, thereby determining one or more frequency responses of the control system at the one or more frequencies; and
  controlling, by the control system, a device while the one or more frequency responses is determined.

20. The method of claim 19, wherein the control system comprises a controller, the device, and a sensor, wherein the controller is configured to control the device, and wherein the sensor measures an output of the device.

21. The method of claim 19, wherein the complex ratio is determined while the control system is operating.

* * * * *